United States Patent

Brink

[11] Patent Number: 5,826,700
[45] Date of Patent: Oct. 27, 1998

[54] CONVEYOR BELT SCRAPER

[75] Inventor: Arend Jacobus Brink, Witbank, South Africa

[73] Assignee: SLIC Trading Company Limited, Douglas, Isle of Man

[21] Appl. No.: 902,840

[22] Filed: Jul. 30, 1997

[30] Foreign Application Priority Data

Aug. 1, 1996 [ZA] South Africa .............................. 96/6526

[51] Int. Cl.[6] .................................................. B65G 45/16
[52] U.S. Cl. ............................................. 198/499; 198/497
[58] Field of Search ...................................... 198/497, 499

[56] References Cited

U.S. PATENT DOCUMENTS

| 4,768,644 | 9/1988 | Cromm | 198/499 |
| 4,787,500 | 11/1988 | Holz | 198/497 |
| 5,339,947 | 8/1994 | Campanile | 198/499 |
| 5,518,107 | 5/1996 | Schwarze | 198/499 |

FOREIGN PATENT DOCUMENTS

| 63-31926 | 2/1988 | Japan | 198/497 |
| 740637 | 6/1980 | U.S.S.R. | 198/497 |

*Primary Examiner*—James R. Bidwell
*Attorney, Agent, or Firm*—Alix, Yale & Ristas, LLP

[57] ABSTRACT

A conveyor belt scraper which includes a bracket which is formed with two arms which extend in opposing directions, and two base pieces which are respectively engageable with the arms.

10 Claims, 3 Drawing Sheets

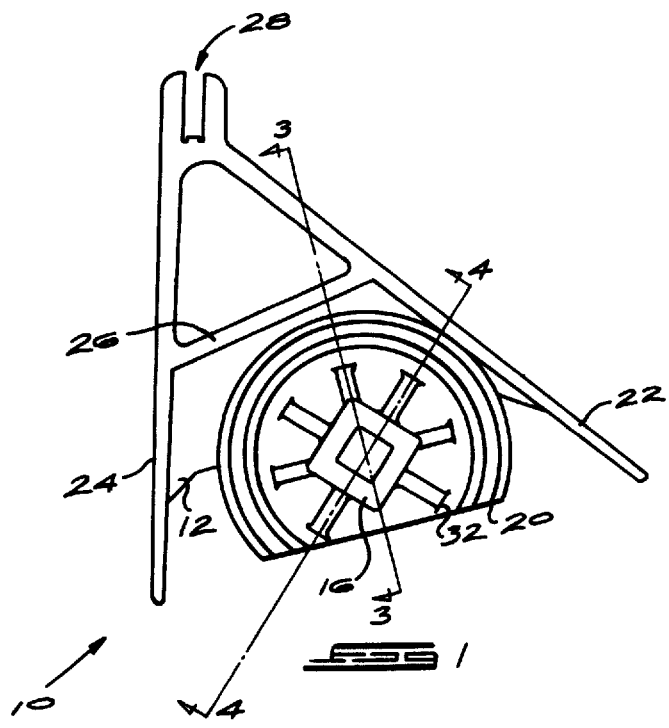
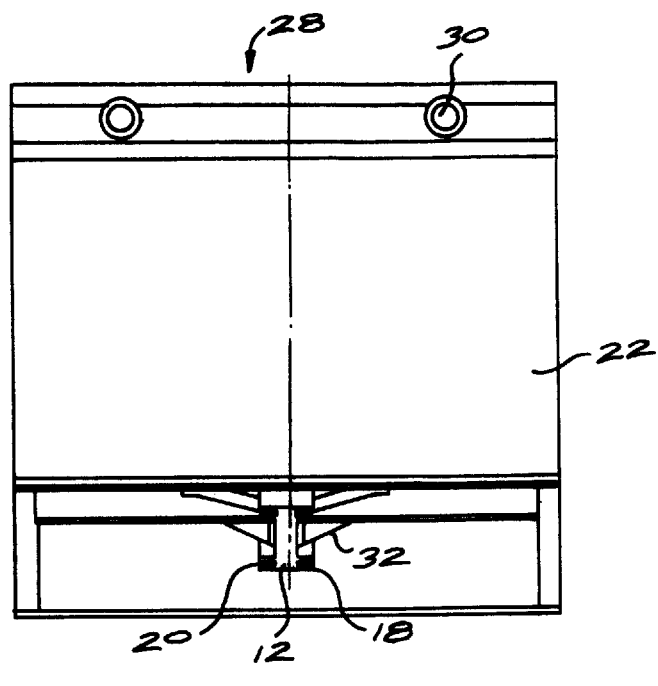

CONVEYOR BELT SCRAPER

BACKGROUND OF THE INVENTION

This invention relates to a conveyor belt scraper and, more particularly, to an assembly for mounting and supporting a scraper blade.

SUMMARY OF THE INVENTION

The invention provides a conveyor belt scraper which includes a bracket which is formed with two arms which extend in opposing directions, and two base pieces which are respectively engageable with the arms.

The bracket may include a support section, such as a web, from which the arms extend.

The base pieces and the bracket may include sealing formations. These may be of any suitable form. The sealing formations may for example comprise interengeged rib and groove formations which provide a labyrinth-type seal.

The sealing formations may permit rotation of the bracket relatively to the base pieces at least to a limited extent.

The bracket may include first and second shields on opposed sides of the arms.

The bracket may include a formation for receiving an end of a scraper blade. This formation may be in the form of a channel.

The bracket may include mounting holes or other mounting formations which permit the scraper blade to be fixed to the bracket.

Each base piece may include a cup formation and a respective arm may be insertable into the cup formation. In use resilient means may be positioned inside each cup formation between an inner surface thereof and an opposing outer surface of the respective arm.

The bracket may be formed integrally from a moulded plastics material such as glass-filled nylon.

BRIEF DESCRIPTION OF THE DRAWINGS

The invention is further described by way of example with reference to the accompanying drawings in which:

FIG. 1 is a side view of a bracket for a conveyor belt scraper according to the invention;

FIG. 2 is a front view of the bracket of FIG. 1;

FIG. 5 is an end view of a base piece for use with the bracket shown in

FIG. 1;

DESCRIPTION OF PREFERRED EMBODIMENT

Figure 3:
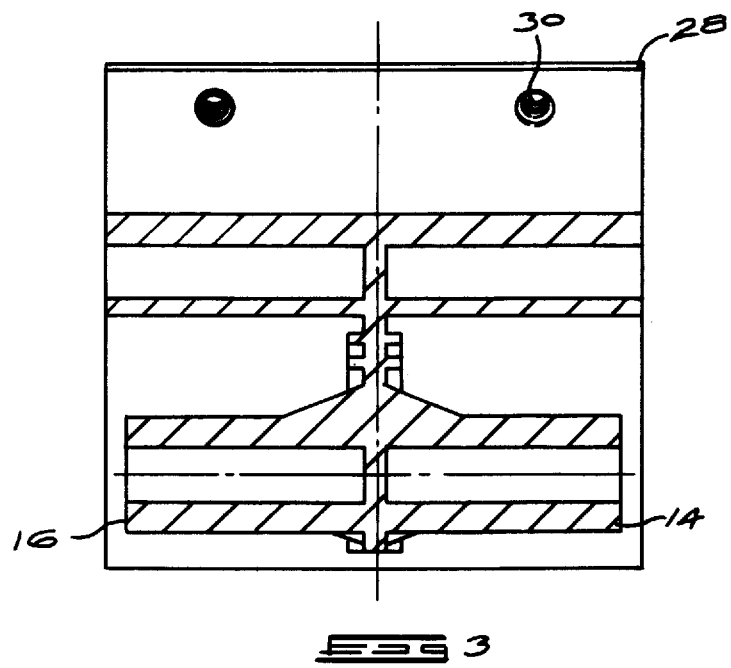
FIG. 3 is a cross-sectional view of the bracket of FIG. 1 taken on the line 3—3.
Figure 4:
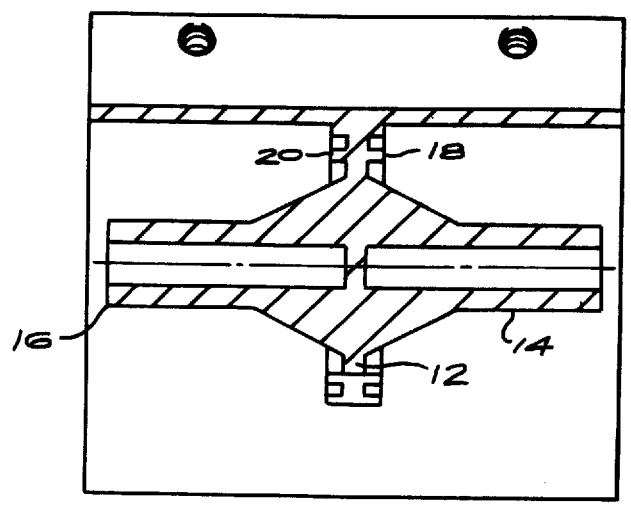
FIG. 4 is a cross-sectional view of the bracket of FIG. 1 taken on the line 4—4.

FIGS. 1 to 4 illustrate a bracket 10 according to the invention. The bracket has an integral construction and is moulded from a suitable plastics material such as glass-filled nylon.

The bracket includes a centrally positioned web 12 and two arms 14 and 16 which extend in opposite directions from the web. Each arm, at its junction with the web, is partially surrounded by a respective raised rib and channel formation 18, 20, of circular outline, see FIG. 1.

The web and the arms are positioned between first and second planar shields 22 and 24 respectively, which are internally braced by means of a transverse member 26, and which extend from a blade mounting channel 28.

Mounting holes 30 are formed through opposed walls of the channel 28.

As is evident from FIGS. 1 and 2 the arms 14 and 16 are braced, and supported on the web 12, by means of a plurality of reinforcing ribs 32.

FIG. 1 shows that the arms have a square shape in cross section.

Figure 5:
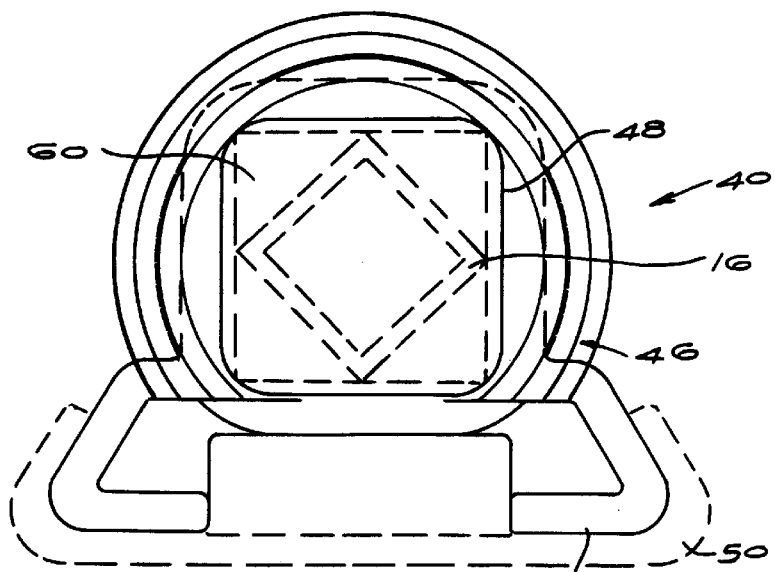
Figure 6:
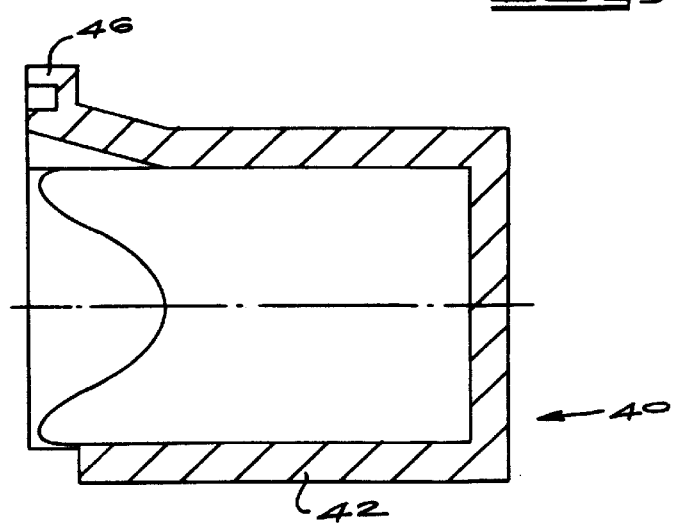
FIG. 6 is a cross-sectional view of the base piece shown in FIG. 5.
Figure 7:
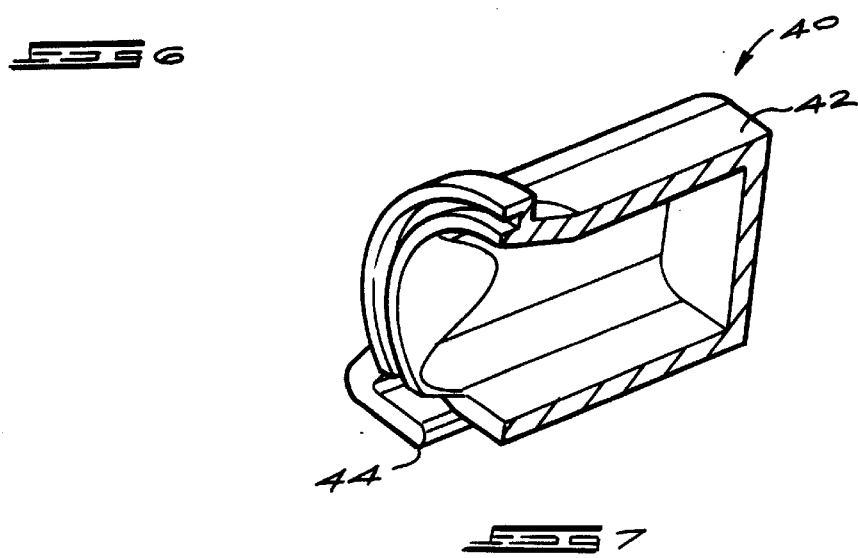
FIG. 7 is a perspective sectioned view of the base piece of FIG. 5.

FIGS. 5, 6 and 7 illustrate a base piece 40 which is one of two identical base pieces used together with the bracket 10 shown in FIG. 1. The base piece is also moulded from a suitable plastics material such as glass-filled nylon.

The base piece includes a cup-shaped housing 42 which is mounted on a pedestal formation 44 and which is partially surrounded, at its mouth, by an arc-shaped rib and groove sealing formation 46. As is evident particularly from FIG. 5 the inner surface 48 of the cup formation is essentially square in cross section.

As has been noted two of the base pieces 40 are used with the bracket 10. Each arm 14, 16 is inserted into the housing of a respective base piece together with four resilient rubber inserts 60, shown in dotted outline in FIG. 5, which lie on the respective flat faces of the arm and which nestle in the respective corners of the inner surface 48.

The base pieces are engaged with a mounting track 50, shown in dotted outline in FIG. 5, which has a profile which is complementary to the outer shape of the pedestal. Each pedestal is moved, with a sliding action in the elongate direction of the track, to a desired position on the track. A number of similar bracket and base piece assemblies can be mounted adjacent one another along the length of the track.

A scraper blade, not shown, if not already mounted in the channel 28, is then positioned with a lower edge in the channel and secured in position by means of fasteners which pass through the mounting holes 30.

In use the bracket can rotate, to a limited extent, relatively to the base pieces about an axis which is aligned with the arms. The degree of rotational movement is however constrained by the rubber inserts 60.

The scraper is used in a way which is conventional and which, consequently, is further not described herein.

The scraper of the invention offers a number of advantages over similar devices which are known to the applicant and which are fabricated from steel.

Excluding the rubber inserts which are positioned around the arms and the scraper blade and fasteners, the scraper of the invention includes only three components which, as they are produced by means of a moulding process, are formed accurately, to a desired tolerance, rapidly and inexpensively. No finishing is required once the components have been moulded and they are immediately ready for use. The components are light, easy to transport, and are resistant to corrosion. They can also be pigmented to a desired colour.

As the components are accurately moulded the alignment of an assembly of scrapers, relatively to one another and to a conveyor belt, is easily effected.

The shields 22 and 24 at least partly shroud the arms and the base pieces and provide protection against dirt and moisture contacting the components. The sealing formations 46 on the respective base pieces are rotatably engaged with the sealing formations 18 and 20 on the web, around the arms, and form labyrinth seals which permit limited rotation of the brackets relatively to the base pieces. These seals, which are themselves located beneath a protected canopy formed by the shields 22 and 24, provide barriers against the ingress of foreign material into the interiors of the cup housings.

I claim:

1. A conveyor belt scraper comprising a bracket formed with two arms extending in opposite directions, and two base pieces which are respectively engageable with the arms, the base pieces and the bracket including sealing formations that permit rotation of the bracket relative to the base pieces at least to a limited extent.

2. A scraper blade mounting assembly which includes two base pieces which are slidably engageable with a support track, and a bracket with a formation which is engageable with a scraper blade, and two arms which are respectively inserted into cup formations in the base pieces with resilient means positioned inside each cup formation between an inner surface thereof and an opposing outer surface of the respective arm.

3. An assembly according to claim 2 wherein each of the base pieces and the bracket have interengaging formations which form a labyrinth-type seal.

4. A conveyor belt scraper comprising a bracket formed with two arms extending in opposing directions, and two base pieces which are respectively engageable with the arms, the base pieces and the bracket including sealing formations that comprise interengaged rib and groove formations which provide a labyrinth-type seal.

5. A scraper according to claim 4 wherein the bracket includes a support section from which the arms extend.

6. A scraper according to claim 4 wherein the bracket includes first and second shields on opposed sides of the arms.

7. A scraper according to claim 4 wherein the bracket includes a formation for receiving an end of a scraper blade.

8. A scraper according to claim 7 wherein the formation is a channel.

9. A scraper according to claim 4 wherein each base piece includes a cup formation which receives a respective arm.

10. A scraper according to claim 9 wherein resilient means are positioned inside each cup formation between an inner surface thereof and an opposing outer surface of the respective arm.

* * * * *